United States Patent
Weber et al.

(10) Patent No.: US 10,279,940 B2
(45) Date of Patent: May 7, 2019

(54) MODULE WRAP FEED ARRANGEMENT

(71) Applicant: DEERE & COMPANY, Moline, IL (US)

(72) Inventors: Scott D. Weber, Bondurant, IA (US); Jeffrey S. Wigdahl, Ames, IA (US); Jeffrey R. Fox, Minburn, IA (US)

(73) Assignee: DEERE & COMPANY, Moline, IL (US)

( * ) Notice: Subject to any disclaimer, the term of this patent is extended or adjusted under 35 U.S.C. 154(b) by 1008 days.

(21) Appl. No.: 14/729,943

(22) Filed: Jun. 3, 2015

(65) Prior Publication Data
US 2016/0353664 A1  Dec. 8, 2016

(51) Int. Cl.
| A01F 15/07 | (2006.01) |
| B65B 41/12 | (2006.01) |
| B65B 11/02 | (2006.01) |
| A01D 43/00 | (2006.01) |
| A01F 15/08 | (2006.01) |
| A01F 15/18 | (2006.01) |

(52) U.S. Cl.
CPC ............ *B65B 41/12* (2013.01); *A01D 43/006* (2013.01); *A01F 15/0715* (2013.01); *A01F 15/08* (2013.01); *A01F 15/18* (2013.01)

(58) Field of Classification Search
CPC ...... A01F 15/0715; A01F 15/18; A01F 15/08; A01F 15/00; B65B 11/025; B65B 41/18; B65B 41/16; A01D 43/006
USPC .................... 100/8, 88, 87; 53/118, 587, 588
See application file for complete search history.

(56) References Cited

U.S. PATENT DOCUMENTS

| 4,262,478 A | * | 4/1981 | Pentith | A01F 15/07 56/341 |
| 4,549,481 A | * | 10/1985 | Groeneveld | A01F 15/07 100/88 |
| 4,597,254 A | * | 7/1986 | Bowden, Jr. | A01F 15/0705 100/88 |
| 4,768,431 A | * | 9/1988 | Merritt, III | A01F 15/0715 100/15 |
| 4,917,008 A | * | 4/1990 | van den Wildenberg | A01F 15/0715 100/15 |
| 5,419,253 A | * | 5/1995 | Campbell | A01F 15/141 100/3 |

(Continued)

FOREIGN PATENT DOCUMENTS

| EP | 0289092 | 11/1988 |
| EP | 0621184 | 4/1994 |

*Primary Examiner* — Jimmy T Nguyen
(74) *Attorney, Agent, or Firm* — Klintworth & Rozenblat IP LLP (57) ABSTRACT

A wrap feed arrangement is disclosed for an agricultural harvester having a module-forming chamber. The arrangement includes a conveyor arrangement, which delivers crop to the module-forming chamber, and a module-forming arrangement which, at least in part, builds the module. The conveyor arrangement has a first roll and a first endless member disposed about the first roll for rotation. The module-forming arrangement has a second roll and a second endless member disposed about the second roll for rotation. At least one of the first and second rolls is movable from a first position in which the first and second endless members are disengaged to a second position in which the first and second endless members are engaged.

20 Claims, 8 Drawing Sheets

(56) References Cited

U.S. PATENT DOCUMENTS

| | | | | |
|---|---|---|---|---|
| 6,321,507 B1 * | 11/2001 | Copeland | ............... | B65H 18/22 |
| | | | | 100/40 |
| 2002/0184861 A1 * | 12/2002 | McClure | ............. | A01F 15/0715 |
| | | | | 53/587 |
| 2015/0047311 A1 * | 2/2015 | Jacobson | ............ | A01F 15/0715 |
| | | | | 56/341 |

* cited by examiner

MODULE WRAP FEED ARRANGEMENT

CROSS-REFERENCE TO RELATED APPLICATION(S)

Not Applicable.

STATEMENT REGARDING FEDERALLY SPONSORED RESEARCH

Not Applicable.

FIELD OF THE DISCLOSURE

This disclosure relates to crop harvesting machines with baling and wrapping arrangements, and more specifically, to limiting wrap mis-feed during a wrapping cycle.

BACKGROUND OF THE DISCLOSURE

Harvested cotton, hay or other crops, or crop by-products such as straw, may be collected and processed through a module-forming apparatus, such as a baler, to produce modules (e.g., round or square bales) of the harvested crop or crop by-products. The module-forming apparatus may be equipped with a wrapping system to bind the module together with wrap material (e.g., twine, net, sheet wrap, etc.). For example, U.S. Pat. No. 6,263,650 discloses a cotton harvesting machine having a round module-forming and wrapping apparatus. The wrapped module may then be transferred from the module-forming apparatus such that the formation of a new module may begin. The wrapped module may be temporarily retained on the harvesting machine before being ejected at a given location, such as at the end of a row in a field of crops, for later transport.

The module-forming and wrapping apparatus may utilize individual, properly sized wraps. The apparatus may also have the capability of separating a predetermined length of wrapping material from a supply roll for applying a desired number of layers of wrap to the module. For example, U.S. Pat. No. 6,787,209 discloses separating pre-partitioned lengths of wrapping material from the supply roll. Other systems may measure the length of continuous wrapping material (e.g., via timers, position sensors, rotation counters, and the like), and thereby determine where to cut the wrapping material from the supply roll.

One challenge arising in module wrapping relates to mis-feeding of the wrapping material. For example, the wrapping material may be improperly guided into the module-forming chamber, or the wrapping material may become incorrectly oriented, folded, or otherwise positioned out of alignment. As a consequence, a module may improperly wrapped or not at all. These mis-wrap events may also result in equipment down time, wasted wrapping material, and exposure of the modules to dirt, moisture, and the like when ejected from the harvesting machine.

SUMMARY OF THE DISCLOSURE

This disclosure provides a module-forming and wrapping system for agricultural harvesting machines which guides the wrapping material during a wrapping operation to prevent or reduce the occurrence of certain mis-feed events.

In particular, one aspect the disclosure provides a wrap feed arrangement for an agricultural harvester having a module-forming chamber. The arrangement may includes a conveyor arrangement having a first roll and a first endless member disposed about the first roll to rotate to deliver crop material to the module-forming chamber. The arrangement may also include a module-forming arrangement associated with the module-forming chamber of the agricultural harvester. The module-forming arrangement has a second roll and a second endless member disposed about the second roll and configured to rotate to form a module within the module-forming chamber. At least one of the first and second rolls is movable from a first position in which the first and second endless members are disengaged to a second position in which the first and second endless members are engaged.

In another aspect the disclosure provides a wrap feed arrangement as noted above and further including a slide mechanism coupled to at least one of the first and second rolls. The slide mechanism is configured to translate at least one of the first and second rolls from the first position, in which the first and second endless members are disengaged, to the second position, in which the first and second endless members are engaged.

In yet another aspect the disclosure provides an agricultural harvesting machine, such as a self-propelled harvester vehicle. The machine may include a module-chamber, a conveyor arrangement, and a module-forming arrangement. The conveyor arrangement includes a first roll and a first endless member disposed about the first roll and configured to rotate to deliver crop material to the module-forming chamber. The module-forming arrangement includes a second roll and a second endless member disposed about the second roll and configured to rotate to form a module within the module-forming chamber. At least one of the first and second rolls is movable from a first position in which the first and second endless members are disengaged to a second position in which the first and second endless members are engaged.

These and other aspects and advantages of the disclosure will become better understood upon consideration of the detailed description of the drawings.

BRIEF DESCRIPTION OF THE DRAWINGS

Like reference numerals will be used to refer to like parts from figure to figure in the following detailed description.

DETAILED DESCRIPTION

The following describes one or more example embodiments of the disclosed module-forming and wrapping system, as illustrated in the accompanying figures of the drawings described briefly above. Various modifications to the example embodiments may be contemplated by one of skill in the art, and it should be understood that the disclosed system may be used with a variety of vehicles in a variety of settings.

As discussed above, in various situations it may be useful to provide a module-forming arrangement for bundling crop material during harvesting. For example, it may be useful to form a chamber defining an interior space with an inlet for receiving crop material therein. The module-forming arrangement and chamber may be configured to form modules having circular (i.e., round bales) or rectangular sections (i.e., square bales). For example, a round module-forming arrangement may be positioned about a circumference of the chamber for forming a round bale. Further, it may be useful to provide a wrap delivery arrangement for guiding a wrapping material about the module to bind the module together for later transport as well as to protect the crop material from debris, moisture or other elements during or after the harvesting process.

One example of a wrap delivery system includes a wrapping material supply roll and one or more wrap rolls for guiding the wrapping material from the supply roll to the module-forming chamber. The wrapping material may pass from the supply roll, around the wrap rolls, and into the module-forming chamber. Upon entering the module-forming chamber, the wrapping material may be guided around an outer surface of the module of crop material. Thereafter, the wrapped module may be transferred from the module-forming chamber.

In certain situations, it is possible for the wrapping material to be improperly guided into the module-forming chamber or around the module during a wrapping operation. A mis-wrap event may include any occurrence in which a wrapping material deviates from a predetermined path between a supply roll and the module-forming arrangement, including the processes of feeding wrapping material to the module as well as wrapping the module. A mis-wrap event may further include any occurrence in which a module of crop material is improperly wrapped (e.g., incompletely wrapped or unwrapped). For example, a mis-wrap event may result in the accumulation of wrapping material in or around one or more components of the module-forming arrangement or wrap delivery system. One possible outcome of a mis-feed event is that the wrapping material may become caught on or wound around a wrap roll of the wrap delivery system instead of being properly fed into the module-forming chamber. As a result, a module may be only partially wrapped or completely unwrapped, and the wrapping material may be damaged or wasted, as well as various other problems that may also arise during or after a wrapping operation.

Use of the disclosed wrap feed roll arrangement may address these and other issues. For example, a wrap feed roll arrangement may be configured to prevent a wrapping material mis-feed event. A mis-feed event may include any occurrence in which a wrapping material deviates from a predetermined path between a supply roll and the module-forming arrangement. A mis-feed event may further include any occurrence in which a module of crop material is improperly wrapped (e.g., incompletely wrapped or unwrapped). For example, a mis-feed event may include the accumulation or bunching of wrapping material in or around the entry point of the wrapping material into the module-forming chamber.

One embodiment of a wrap feed roll arrangement may include a crop conveyor arrangement including a rear roll, and a plurality of endless belts disposed for travel around the rear roll. The crop conveyor arrangement may be engaged by a drive system for guiding crop material across the belts and through an inlet into a module-forming chamber of a harvesting machine. The wrap feed roll arrangement may further include a module-forming arrangement including a bottom front gate roll spaced apart from the rear roll of the conveyor arrangement, and a plurality of endless belts disposed for travel around the bottom front gate roll. The module-forming arrangement may be engaged by the drive system for guiding a wrapping material between the rear roll and the bottom front gate roll, and into the module-forming chamber for wrapping a module of crop material formed therein. The crop conveyor arrangement may be disengaged from the drive system and the rear roll may be transitioned from a first position, in which the rear roll is spaced apart from the bottom front gate roll, to a second position. In the second position, the rear roll may be positioned adjacent the bottom front gate roll such that the belts of the crop conveyor arrangement engage the belts of the module-forming arrangement in the space between the rear roll and the bottom from gate roll. Accordingly, when the rear roll is in the second position, the rear roll and the bottom front gate roll are coupled for opposed rotation when the module-forming arrangement is engaged with the drive system.

In operation, crop material may be metered across the crop conveyor arrangement and into the module-forming chamber to form a module of crop material. When the module has reached a prescribed size, the drive system may be disengaged from the conveyor arrangement and the rear roll may be transitioned from the first position to the second position to engage the belts of crop conveyor arrangement with the belts of the module-forming arrangement. Wrapping material may be guided into the nip or pinch location formed between the rear roll and the bottom from gate roll. The drive system may engage the module-forming arrangement to actively feed the material through the nip or pinch location and into the module-forming chamber to wrap the module. After the module wrapping operation is initiated, the rear roll may be transitioned from the second position back to the first position. Accordingly, after the wrapped module is ejected from the module-forming chamber, the drive system may engage the conveyor arrangement to begin metering additional crop material into the module-forming chamber to begin the formation of new module. Further embodiments of a wrap feed roll arrangement may be similarly employed as will be described herein.

Figure 1:
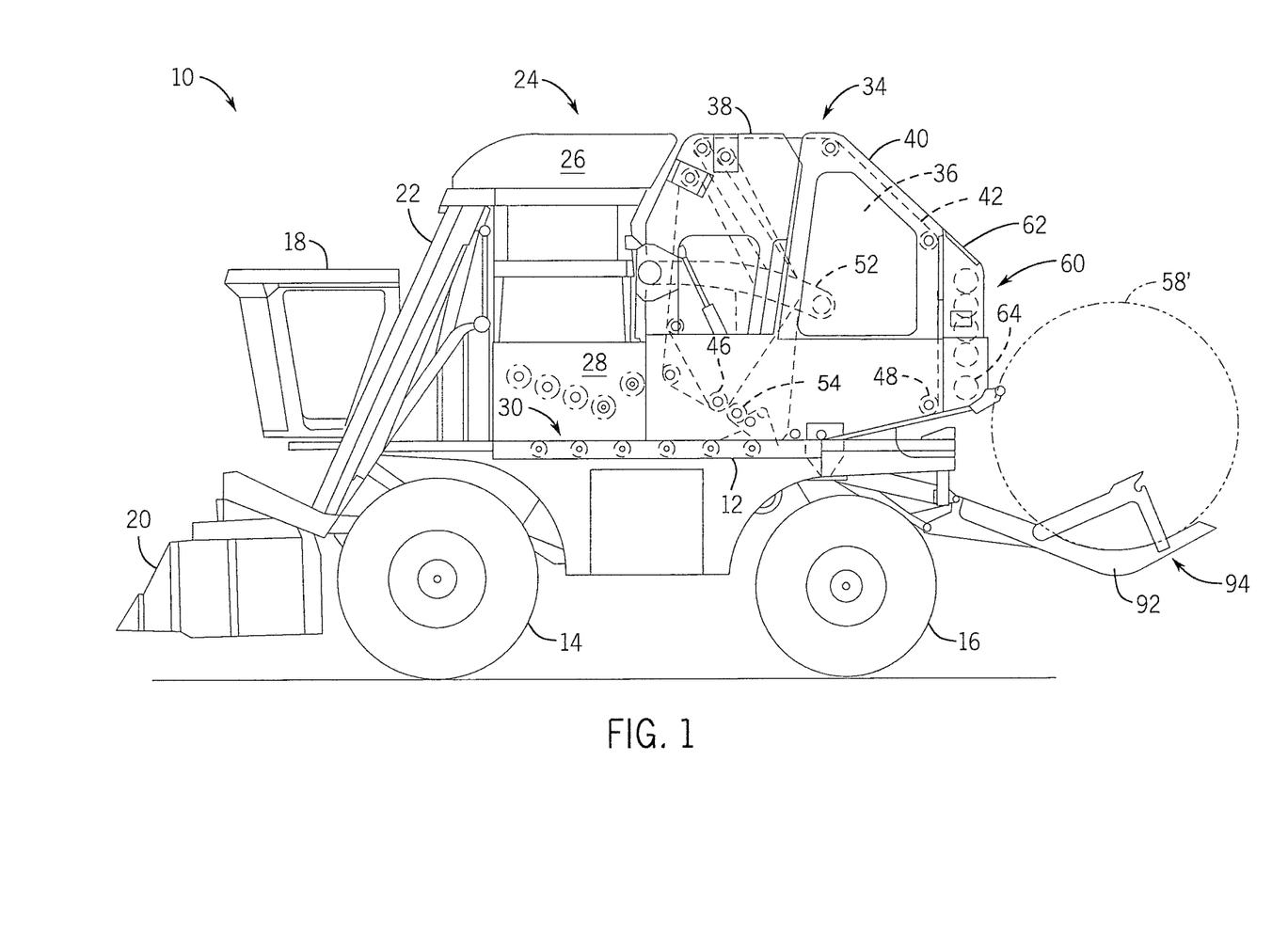
FIG. 1 is a schematic side view of an example crop harvesting machine in the form of a cotton harvester, which has a round module-forming and wrapping system.
Figure 2:
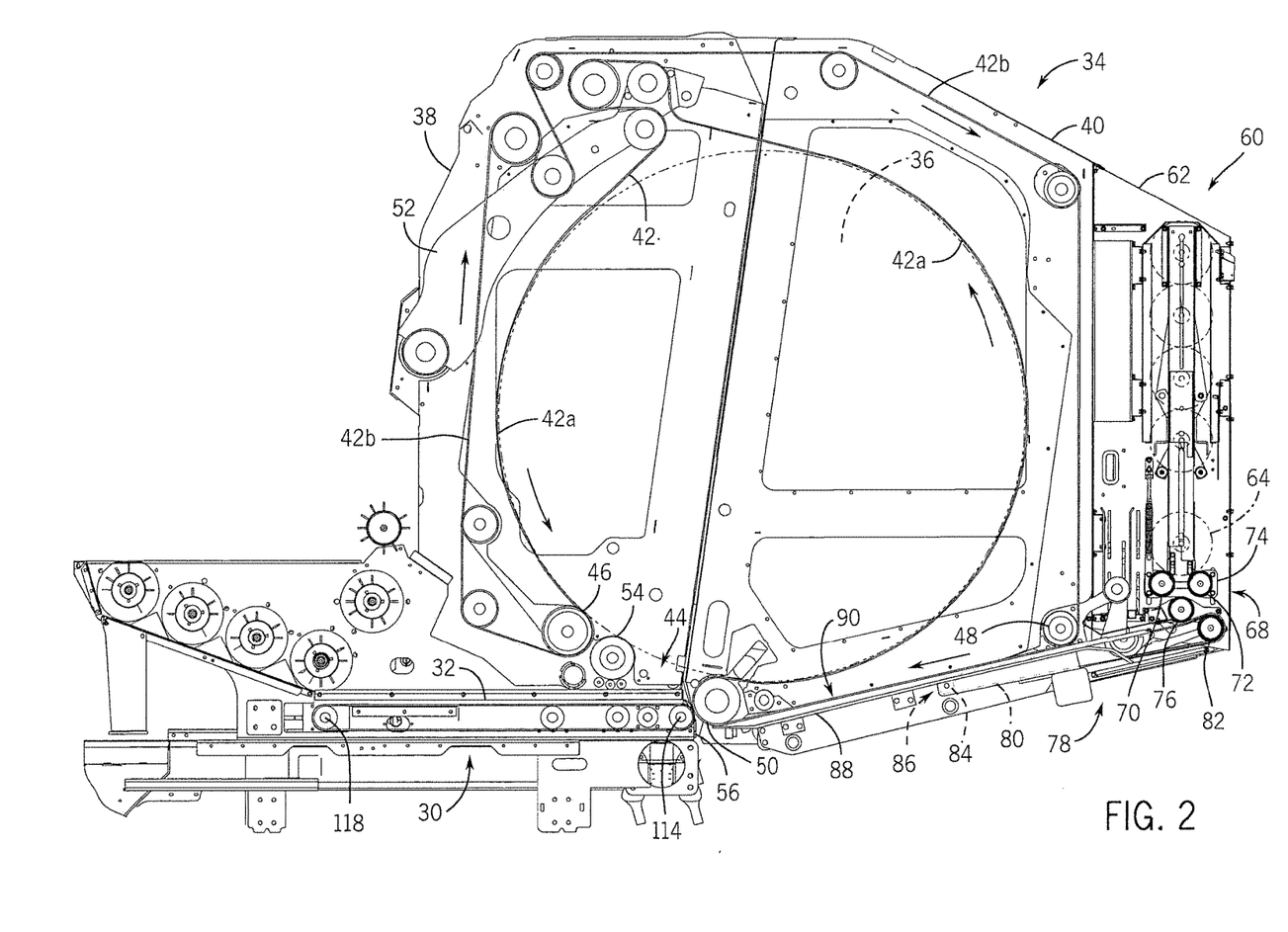
FIG. 2 is an enlarged side view of the round module-forming and wrapping system of the cotton harvester of FIG. 1.

Referring now to FIGS. 1 and 2, there is shown a self-propelled cotton harvester 10 including a chassis frame 12 supported for movement by front drive wheels 14 and rear steerable wheels 16. An operator's station or cab 18 is supported at an elevated forward location of the frame 12 so as to provide an operator a clear view of a harvesting head 20 mounted to a forward end of the frame 12. As is understood, the harvesting head 20 operates to remove cotton bolls from cotton plants, either in a picking or stripping action, and direct the removed cotton bolls into an air conveying system including an air duct arrangement 22 leading to an accumulator 24 with an upper inlet structure 26 and a metering floor 28 supported on the frame 12 behind the cab 18 for receiving the cotton. Beneath the metering floor 28 is a substantially horizontal belt conveyor arrangement 30 including an endless feed belt arrangement 32 (see FIG. 2) that conveys the cotton to an onboard round module-forming (or baler) arrangement 34, which is supported on the frame 12 at a location rearward of the accumulator 24 and is operable for forming large cylindrical modules of harvested cotton.

The module-forming arrangement 34 may include a module-forming chamber 36 of suitable size and shape. Specifically, the module-forming chamber 36 may include a fixed front section 38 mounted to the main frame 12, and a rear section in the form of a discharge gate 40. The gate 40 may have an upper front location mounted to an upper rear location of the front section 38 so as to establish a pivot assembly defining a generally horizontal transverse pivot axis about which the discharge gate 40 may pivot. Any suitable actuator may actuate the gate 40, for example a hydraulic cylinder assembly (not shown), which can move the gate 40 between a lowered baling position, as shown in FIG. 1, and a raised discharge position (not shown) permitting a completed and wrapped cotton module to be discharged beneath it.

With continued reference to FIGS. 1 and 2, the periphery of the module-forming chamber 36 may be defined by the module-forming arrangement 34. For example, the module-forming arrangement 34 may include a plurality of endless members, such as belts 42, for example, formed of one or more sections having ends spliced or pinned together to form a loop, supported in side-by-side relationship across a support roll arrangement of fixed and movable support rolls. Specifically, near an inlet 44 at the bottom of the module-forming chamber 36, the support roll arrangement includes a stationary lower forward roll 46, a stationary bottom rear gate roll 48 and a stationary bottom front gate roll 50 all extending between and having opposite ends rotatably mounted to the front section 38 or the gate 40 at the sides of the module-forming arrangement 34. The module-forming arrangement 34 also includes a belt tensioning arm 52 mounted within the module-forming chamber 36.

In an initial position corresponding to when the module-forming chamber 36 is in an empty condition, the module-forming belts 42 define the perimeter of the chamber 36, which is initially a generally triangular shape, as viewed from the side. The tensioning arm arrangement 52 may include tensioning elements (not shown) so as to yieldably resist their upward movement as the module-forming chamber 36 becomes filled with cotton. One or more of the fixed rolls are driven so as to cause the belts 42 to be driven, with the drive direction being such as to cause the incoming cotton to travel counterclockwise as it is added as a spiral layer to the growing cotton module. To aid in this counterclockwise movement of the cotton during initial formation of the module, a driven starter roll 54 extends between a front module-forming chamber section. As viewed in FIG. 2, the starter roll 54 is driven clockwise so as to strip the cotton conveyed by the downwardly traveling run of the module-forming belts 42 forming the front of the triangular shaped space, with the result that the cotton is rolled into a cylinder, which grows and expands against the tensioned belts until a module of a desired diameter is formed.

As can be seen in FIGS. 2, 3, 5 and 6, the conveyor arrangement 30 has a rear terminal end 56 located adjacent a front periphery of the lower front gate roll 50 so that cotton is conveyed directly against the module-forming belts 42 engaged with the roll 50. When the discharge gate 40 is in its lowered, baling position, as shown in FIGS. 1 and 2, the forward roll 46 and the starter roll 54 of the fixed front chamber section 38 are each located at a height above the height of the lower front gate roll 50, with the rolls 46, 50 and 54 being located so that their peripheries are located to engage the circumference of a completed cotton module 58 located in the module-forming chamber 36.

Figure 4:
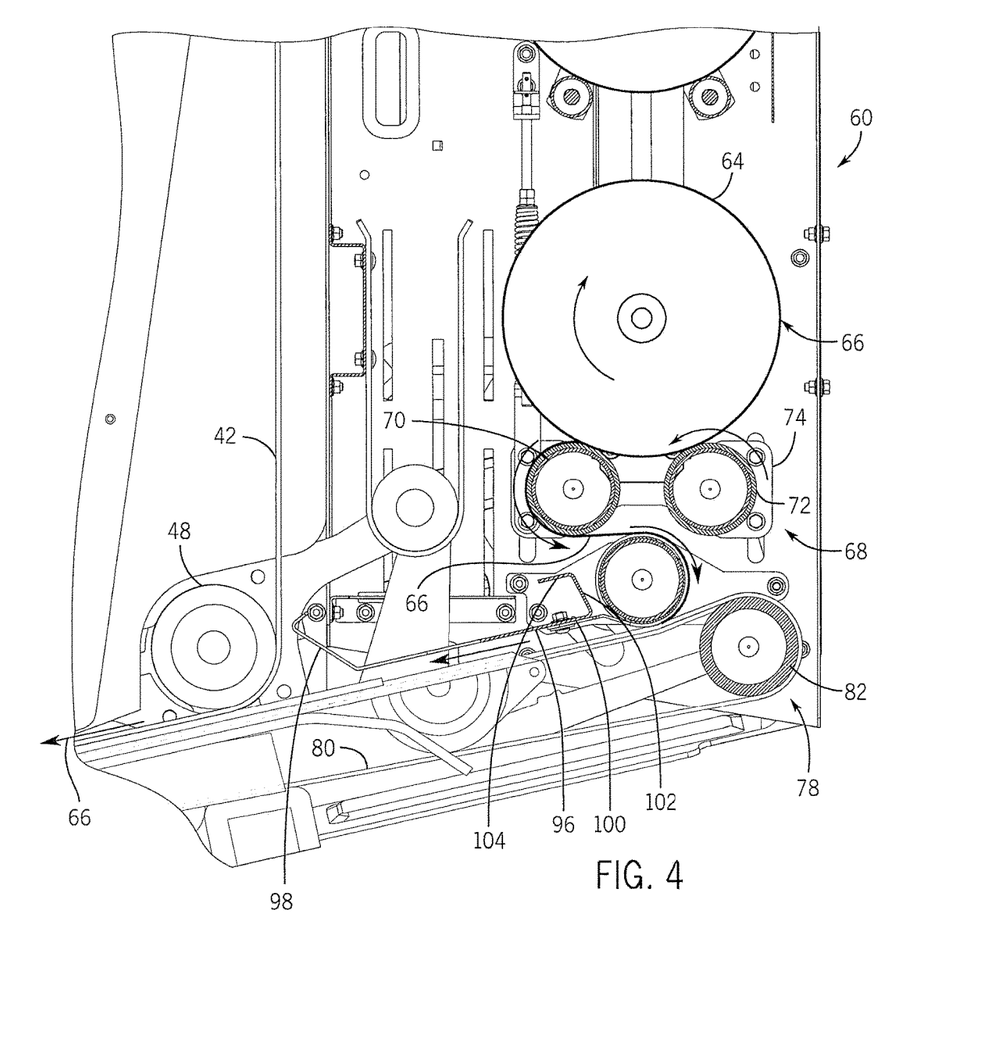
FIGS. 4 and 5 are partial side views showing wrap feed components of the wrapping system.
Figure 5:
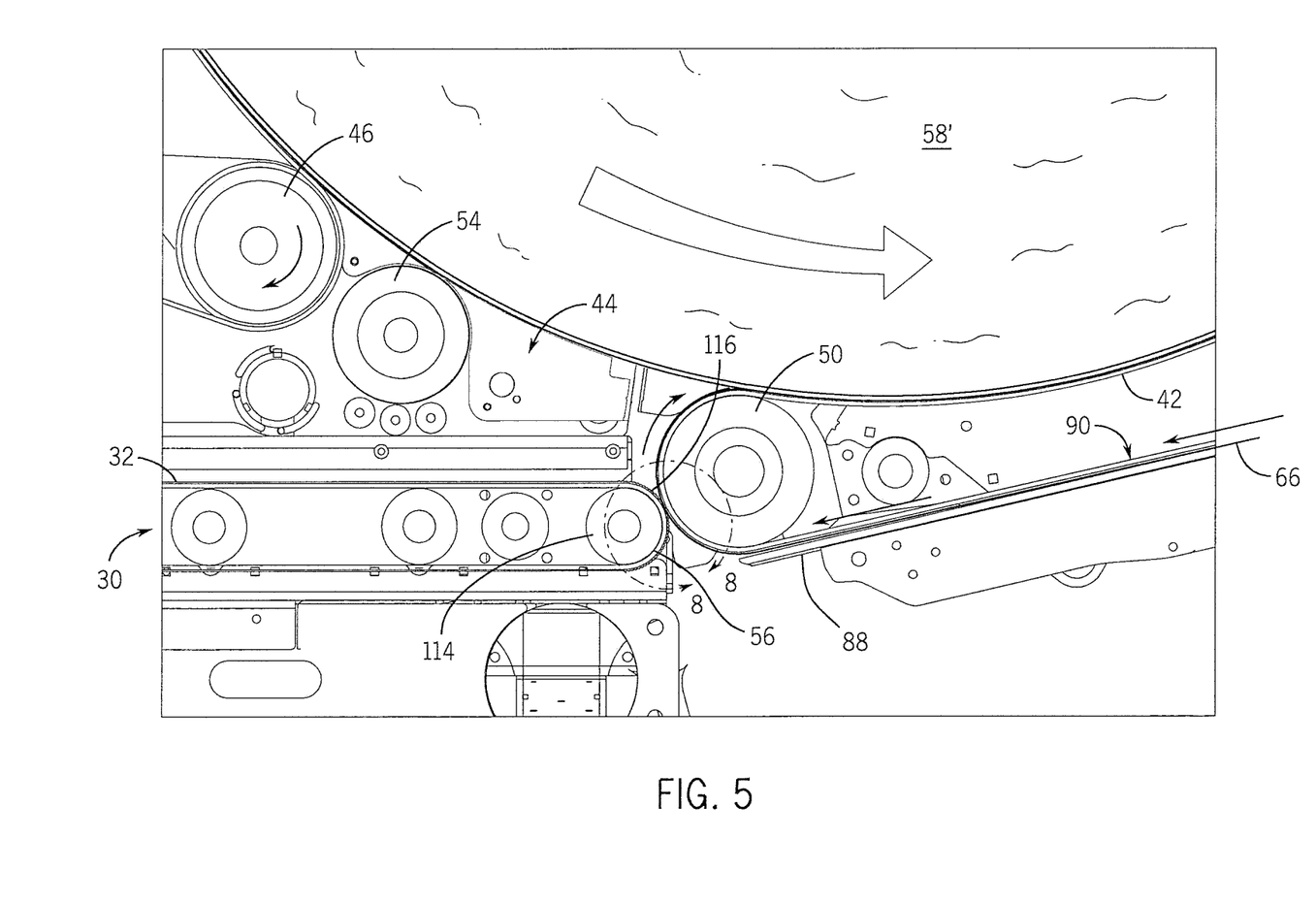

Referring to FIGS. 1 and 4, a module or bale wrapping system 60 is shown mounted at the rear of the discharge gate 40 for the purpose of wrapping the completed module of cotton 58 so as to hold it together and protect it from the elements once it is discharged from the module-forming chamber 36. The wrapping system 60 includes a cover 62 covering an active wrapping material supply roll 64 consisting of wrapping material 66. The wrapping material 66 may be any suitable wrapping material, such as including netting or sheet wrap.

With reference to FIGS. 1, 2 and 4, the supply roll 64 may be mounted on an upper wrap roller assembly 68 that includes a front upper wrap roll 70 and a rear upper wrap roll 72 mounted for rotation on a moveable carriage 74. The supply roll 64 can be rotated in a clockwise direction as viewed in FIGS. 3, such that an end section of wrapping material 66 may extend around a forward side of the front upper wrap roll 70 and be fed between the front upper wrap roll 70 and a lower wrap roll 76. The carriage 74 may be transitioned from a raised position (as shown in FIG. 4) to a lowered position (not shown) such that the front upper wrap roll 70 and the rear upper wrap roll 72 are in contact with the lower wrap roll 76.

The lower wrap roll 76 may be positioned above a wrap conveyor arrangement 78, including a plurality of endless wrap feed belts 80, that conveys the wrapping material 66 toward the module-forming chamber 36. The wrap feed belts 80 may be supported on rear wrap conveyor roll 82 and a front wrap conveyor roll 84. A forward section 86 of the wrap conveyor arrangement 78 may be positioned beneath a section of the module-forming belts 42 that extends between the bottom rear gate roll 48 and the bottom front gate roll 50.

Continuing toward the module-forming chamber 36, a wrap floor 88 may be positioned forward of the wrap conveyor arrangement 78 and beneath the section of module-forming belts 42 that extends between the bottom rear gate roll 48 and the bottom front gate roll 50. An upper face 90 of the wrap floor 88 may be generally aligned with the wrap feed belts 80. Accordingly, at the beginning of a wrapping cycle, the front upper wrap roll 70, rear upper wrap roll 72, and lower wrap roll 76 are actuated to deliver a length of wrapping material 66 against the wrap feed belts 80. The wrap material 66 may then be carried toward the forward section 86 of the wrap conveyor arrangement 78 where the wrapping material 66 is drawn between the module-forming belts 42 and the wrap feed belts 80. The module-forming belts 42 guide the wrapping material 66 along the belts of the wrap floor 88, and then around the lower front gate roll 50 proximate the terminal end 56 of the conveyor arrangement 30 and into the module-forming chamber 36, by way of the chamber inlet 44.

Upon entering the module-forming chamber 36, the length of wrapping material 66 is trapped between the module-forming belts 42 and the completed cotton module 58. The speed at which the wrapping material 66 is moved by the belts 42 and the rotating module 58 may be greater than the speed at which it is delivered by the wrap feed rolls 70, 72 and 76, causing the wrapping material 66 to be tensioned and stretched as it is wrapped about the module 58. Once a desired length of the wrapping material 66 (three wraps or revolutions, for example) is wrapped about the module 58, the wrap feed rolls 70, 72 and 76 are paused and the wrapping material 66 associated with the module 58 is separated from the remaining wrapping material 66 associated with the supply roll 64. In some embodiments, the wrapping material 66 may be cut, for example, with a knife, laser or other cutting implement. In other embodiments, a supply roll 64 may include pre-partitioned lengths of wrapping material 66.

In the case of pre-partitioned lengths of wrapping material 66, it is possible that adjacent segments of the wrapping material 66 may be interleaved together at a lapped joint, which may be connected together by an adhesive permitting separation of the joint upon the application of a predetermined tensile force without requiring a cutting mechanism. Rather, all that is required is to apply a braking force to the supply roll 64, with the wrapping action of the module 58 and module-forming belts 42 creating the tensile force necessary for separating the joint. Separation of the joint then exposes adhesive which serves to adhere the outer end section to the underlying layer of wrapping material 66. Further, each segment or pre-partitioned length of wrapping material 66 may be a predetermined length sufficient for providing a desired number of wraps about the circumference of a module 58 having a predetermined diameter. Thus, each of the wrapping material supply rolls 64 may be manufactured to wrap a given number of modules 58 having a predetermined diameter.

Upon completion of a wrapping cycle, a signal may be provided to a controller (not shown) located in the cab 18 of the harvester 10 for initiating transfer of the wrapped module 58' from the module-forming chamber 36. For example, the operator may cause a pair of hydraulic gate cylinders (not shown) to actuate and pivot the discharge gate 40 to its raised discharge position so that the wrapped module 58' may roll onto a cradle-shaped framework 92 of a module discharge arrangement 94. The module 58' may then be ejected from the cotton harvester 10 at a desired time and location.

Turning back to FIG. 4, a wrap guide 96 includes a plurality of transversely spaced runners 98 that extend above the wrap conveyor arrangement 78. The runners 98 project from a base 100 of the wrap guide 96 in a longitudinal direction towards the module-forming chamber 36 at a downward grade parallel to the wrap conveyor arrangement 78 and the wrap floor 88. The base 100 transitions into a side wall 102 that extends at an upright angle to the base 100. In one aspect, the side wall 102 is generally oriented towards the lower wrap roll 76. The side wall 102 in turn transitions into a ceiling 104 that extends back towards the module-forming chamber at an angle to the side wall 102 and parallel to the base 100.

Together, the base 100 and each of the runners 98 form a ceiling above the wrap conveyor arrangement 78. Accordingly, as the wrapping material 66 transitions from the lower wrap roll 76 onto the wrap feed belts 80, the wrapping material 66 guided between the wrap guide 96 and the wrap conveyor arrangement 78 toward the module-forming chamber 36. However, in certain situations, it may be possible for the wrapping material 66 to become impeded or caught at various points along the path of the wrapping material 66 between the supply roll 64 and the module-forming chamber 36. For example, the wrapping material 66 may become bunched or folded near the inlet 44 to the module-forming chamber 36 if the wrapping material 66 is not properly guided between the terminal end 56 of the conveyor arrangement 30 and the bottom front gate roll 50.

As described above, if the wrapping material 66 accumulates or becomes caught at this or another location, there is the possibility that the wrapping material 66 may become caught on the lower wrap feed roll 76. As a consequence, the lower wrap feed roll 76 may wind up the wrapping material 66 pulling from the wrapping material 66 that has accumulated on the wrap floor 88, the wrapping material 66 feeding off the supply roll 64, or a combination thereof, which may result in winding several portions of wrapping material 66 around the lower wrap feed roll 76. In another aspect, bunching of the wrapping material 66 (or another like mis-feed event) may result in the wrapping material 66 feeding into the module-forming chamber 36 with an improper configuration or orientation. This may result in an improperly or incompletely wrapped module 58.

Figure 8:
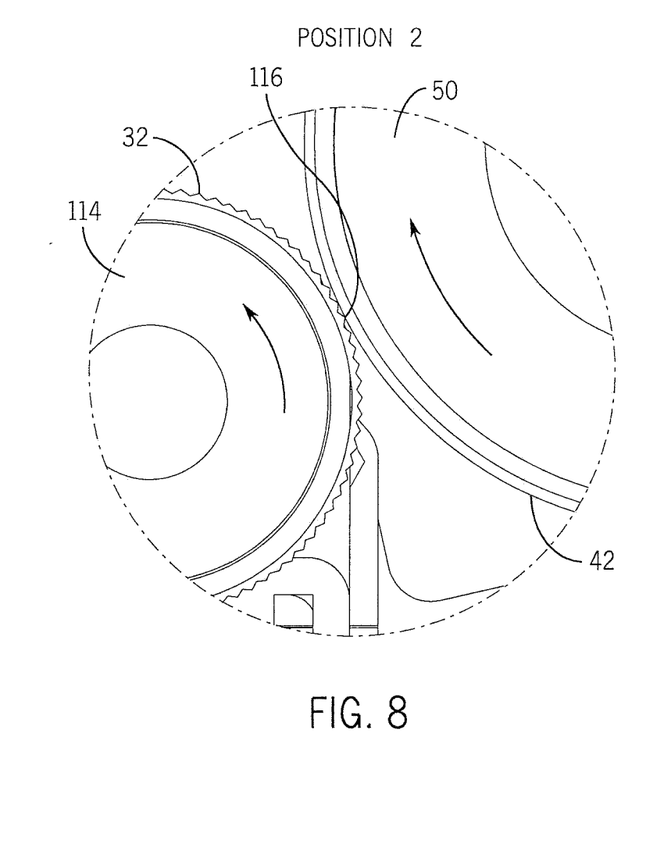
FIG. 8 is an enlarged partial side view of the wrap feed roll arrangement of FIG. 6 in a second position as taken along the arc 8-8 of FIG. 5.

Turning now to FIGS. 3 and 5-8, an embodiment of a wrap feed roll arrangement 110 may be configured to prevent a wrap mis-feed event associated with the inlet of the wrapping material 66 into the module-forming chamber 36 near the bottom front gate roll 50. An embodiment of a wrap feed roll arrangement 110 may include at least one mechanism 112 for transitioning a rear roll 114 of the conveyor arrangement 30 from a first position (FIG. 7) to a second position (FIG. 8). In the first position, the rear roll 114 is spaced apart from the bottom front gate roll 50 such that the belts 32 and the belts 42 are also spaced apart. By comparison, in the second position, the rear roll 114 may be positioned adjacent the bottom front gate roll 50 such that the belts 32 of the conveyor arrangement 30 engage the belts 42, thereby forming a nip or pinch location 116 in the space between the rear roll 114 and the bottom from gate roll 50. The nip or pinch location 116 may be a line or surface area contact of the engaging belts 32 and belts 42. Accordingly, when in the second position, the rear roll 114 and the bottom front gate roll 50 are coupled for opposed rotation when the belts 42 of the module-forming arrangement 34 are in motion. In the second position, the rear roll 114 and the bottom front gate roll 50 may combine to positively feed the wrapping material 66 through the nip or pinch location 116 and into the module-forming chamber 36.

In some embodiments, a mechanism 112 may operate in conjunction with a drive system (not shown) of the cotton harvester 10. For example, the cotton harvester 10 may include one or more drive systems for independently engaging the energized or moveable components of the cotton harvester 10. For example, a drive system may be able to independently engage the conveyor arrangement 30, the belts 42, the fixed or moveable rolls of the module-forming arrangement 34 (e.g., the lower forward roll 46, the bottom rear gate roll 48, or the bottom front gate roll 50), or another component, arrangement, or system of the cotton harvester 10.

In one embodiment, a drive or drive system may selectively and independently engage the conveyor arrangement 30. Engaging the conveyor arrangement 30 may advance the belts 32, rotate one of the rolls of the conveyor arrangement 30 (e.g., rear roll 114), or a combination thereof. In one example, a drive or drive system may engage a front roll 118 of the conveyor arrangement 30, thereby advancing the belts 32 and the rear roll 114. In another example, a drive or drive system may engage the rear roll 114 or the belts 32 directly.

In another embodiment, a drive or drive system may selectively and independently engage one or more components of the module-forming arrangement 34, including the belts 42 and the bottom front gate roll 50. Engaging the module-forming arrangement 34 may advance the belts 42, rotate one of the fixed or moveable rolls (e.g., the bottom front gate roll 50), or a combination thereof. Further, the drive system may be configured to operate any one of the components in a forward or reverse direction. For example, the belts 32 and rear roll 114 may be made to advance in either a clockwise or counterclockwise direction when viewed from the side of the harvester, and the belts 42 and the bottom front gate roll 50 may be made to rotate in the opposite rotational direction.

As stated above, a drive or drive system may be configured to engage a component of the cotton harvester 10 in a selective and independent manner. The terms "engage," "engaging," "engagement" and the like mean that the drive may energize a component, for example, by advancing a belt, rotating a roll, lifting a gate, translating a roll though space, or the like. Further, engaging a component with a drive or drive system may include maintaining or forming a physical or mechanical connection between the drive and the component. Similarly, disengaging from a component may include breaking, pausing, or otherwise disrupting a physical or mechanical connection. By "selective", it is meant that the drive may be engaged or disengaged on demand or in response to a programmed control scheme. For example, an operator of the cotton harvester may press a button or respond to a machine prompt to engage or disengage the drive. By "independent", it is meant that the drive may engage or disengage two or more components independently of one another. For example, the drive system may be configured to simultaneously engage a first component and a second component. At a later time, the drive system may independently disengage from the first component while continuing to engage the second component. Thereafter, the drive system may simultaneously disengage from the second component and reengage the first component.

Figure 3:
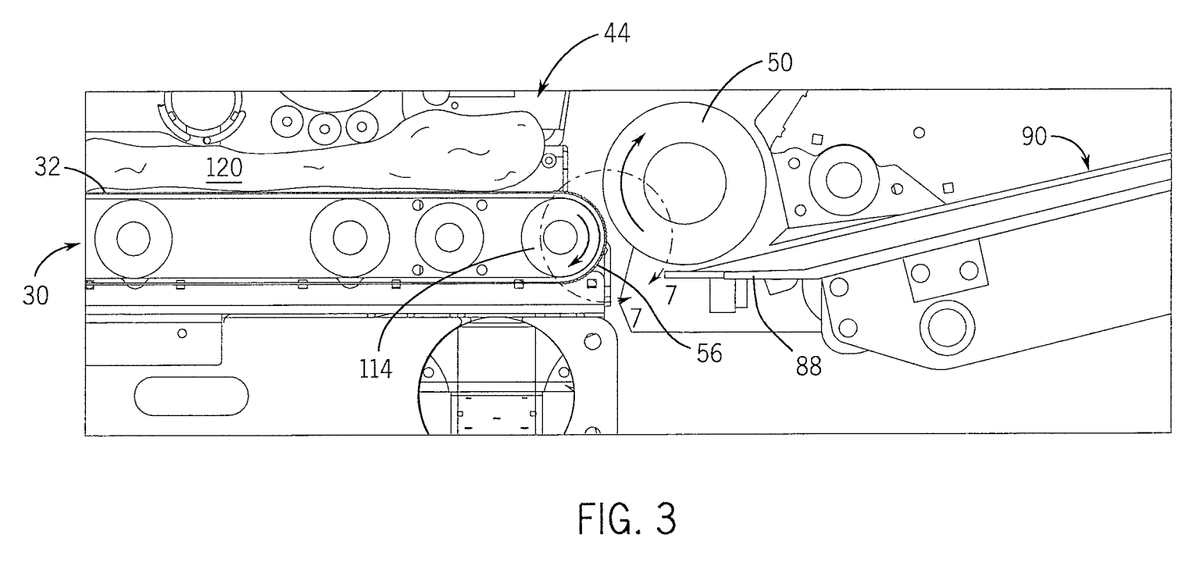
FIG. 3 is an enlarged partial side view showing an inlet to a module-forming chamber.

With continued reference to FIGS. 3 and 5-8, a drive system of the cotton harvester 10 may be configured to engage the conveyor arrangement 30 to advance the belts 32 and the rear roll 114 in a counterclockwise direction as indicated by the corresponding arrows in FIG. 3. Accordingly, crop material 120 entering the cotton harvester 10 from the metering floor 28 may be advanced towards the inlet 44 by the movement of the belts 32. The drive system may continue to engage the conveyor arrangement 30 to advance crop material 120 toward the inlet 44 and into the module-forming chamber 36 until the module 58 achieves a prescribed size. To aid in the formation of the module 58, the drive system may selectively and independently engage the module-forming arrangement 34 to advance the belts 42 and rotate the bottom front gate roll 50. As viewed in FIGS. 2 and 3, the belts 42 may be engaged by the drive to advance the inner path 42a of the belts 42 in a generally counter-clockwise direction as indicated by the arrows in FIG. 2. By comparison, the outer path 42b of the belts 42 may be advanced in a generally clockwise direction. It will be appreciated that the direction in which the belts 42 are perceived to advance may be determined by the number and configuration of the various rolls of the module-forming arrangement 34.

When the module 58 has achieved a prescribed size, the drive system may disengage from the conveyor arrangement 30. For example, a braking mechanism or clutch may be applied to the conveyor arrangement 30 to prevent further advancement of the belts 32, rotation of the rear roll 114, or movement of another component of the conveyor arrangement 30. In addition or alternatively, a physical or mechanical connection with the conveyor arrangement 30, or a portion thereof, may be broken or disrupted to reversibly decouple the movement of the conveyor arrangement 30 (or a component thereof) from the drive system. As described above, disengagement of the drive system from the conveyor arrangement 30 may occur independent of other interactions between the drive system and the other components of the cotton harvester 10. For example, the belts 42 or another component of the module-forming arrangement 34 may continue to be engaged by the drive system during or after the disengagement of the conveyor arrangement 30. Accordingly, the belts 42 may continue to advance as illustrated in FIG. 3 even though belts 32 or rear roll 114 are static.

Figure 6:
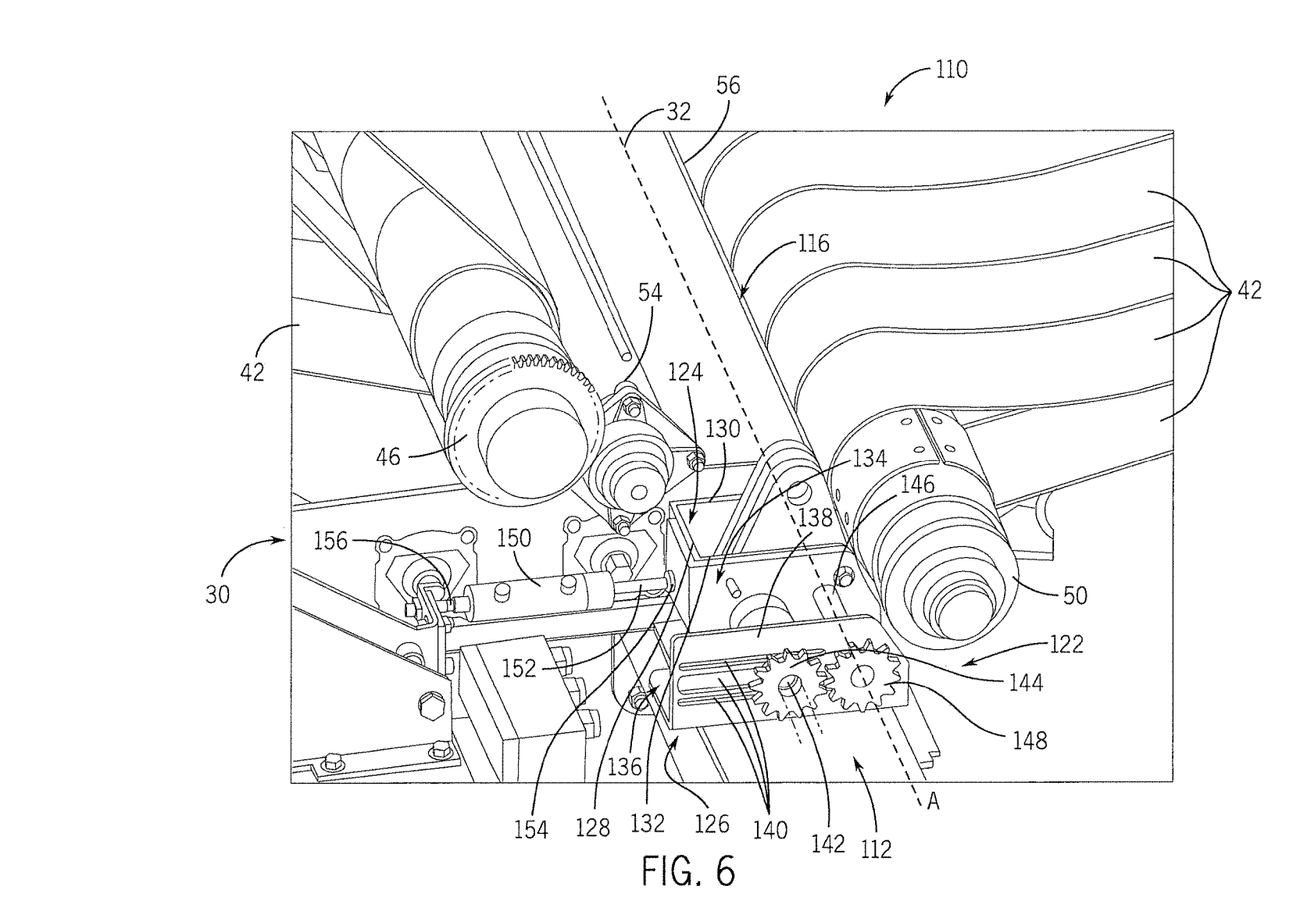
FIG. 6 is a partial perspective view of a wrap feed roll arrangement according to the present disclosure.
Figure 7:
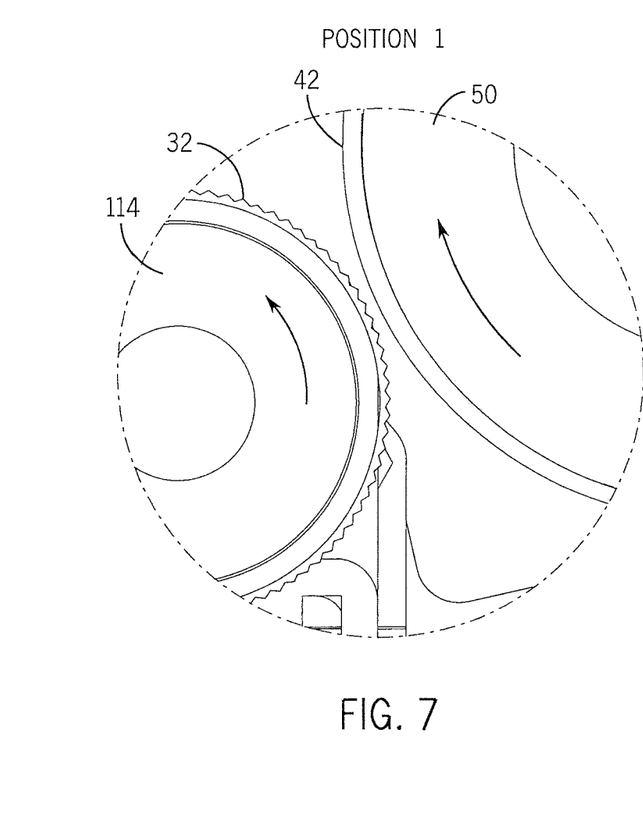
FIG. 7 is an enlarged partial side view of the wrap feed roll arrangement of FIG. 6 in a first position as taken along the arc 7-7 of FIG. 3.

Upon disengaging the conveyor arrangement 30 from the drive system, the mechanism 112 may effect a translation of the rear roll 114 in a direction orthogonal to the axis "A" of rotation of the rear roll 114. With reference to FIG. 6, in the illustrated embodiment, the mechanism 112 includes a carriage 122 formed from a U-shaped coupling 124 and guide assembly 126. The coupling 124 includes a front wall 128 connected to a right side wall 130 and an opposed left side wall 132. The guide 126 includes a first L-shaped mounting bracket 134 that wraps around and couples to the front wall 128 and the left side wall 132 of the coupling 124. The guide 126 further includes a second L-shaped bracket 136 that is arranged generally at a right angle to the first mounting bracket 134. A bottom wall of the mounting bracket 136 transitions at an upright perpendicular angle into a side wall 138. The side wall 138 includes a series of parallel tracks 140 that form openings that extend in a horizontal direction along a portion of the length of the side wall 138. The tracks 140 are positioned to accommodate an axle 142 mounting a fixed sprocket 144. For example, the tracks 140 may be formed in the guide 126 to enable the carriage 122 to slide back and forth along the axle 142.

The carriage 122 may include various holes, apertures or other features for mounting or accommodating an axle 146 of the rear roll 114 for rotation. The axle 146 may extend from an end of the rear roll 114, through the right side wall 130 and left side wall 132 of the coupling 124, and through the mounting bracket 134 and the side wall 138 of the mounting bracket 136. An end of the axle 146 couples to a one-way sprocket 148. The one-way sprocket 148 may be engaged to enable rotation of the rear roll 114 in one of a clockwise and counter-clockwise direction and impede rotation of the rear roll 114 in the opposite direction. In the illustrated embodiment, the one-way sprocket 148 may engage the fixed sprocket 144 when the rear roll 114 is in the first position. While the one-way sprocket 148 is engaged, the rear roll 114 may freely rotate (in the clockwise direction as viewed in FIG. 6). However, engagement of the one-way sprocket 148 with the fixed sprocket 144 may prevent rotation of the rear roll 114 in the opposite (i.e., counter-clockwise) direction. By comparison, when the one-way sprocket 148 is not engaged by the fixed sprocket 144 or another component, the rear roll 114 may be capable of freely rotating in either the clockwise or counter-clockwise directions. The fixed sprocket 148 may be disengaged when the rear roll 114 or the mechanism 112 is in the second position.

With continued reference to FIG. 6, the mechanism 112 may further include a hydraulic or pneumatic cylinder 150 housing a piston 152. The piston 152 may be linearly displaceable along the length of the cylinder 150. A first end 154 of the piston 152 may be coupled to the mounting bracket 134 of the guide 126. An opposing end 156 of the pneumatic cylinder 150 may be mounted to a fixed point on the cotton harvester 10 such as the frame 12, a wall, or another feature of the module-forming chamber 36. In one aspect, the piston 152 may couple to the carriage 122, which in turn is coupled to the rear roll 114. Accordingly, actuation of the pneumatic cylinder 150 may cause the piston 152 to transition the rear carriage 122 from the first position to the second position, thereby effecting a translation of the rear roll 114.

With the mechanism 112 and the rear roll 114 in the second position, the belts 32 may engage the belts 42, thereby coupling the rear roll 114 and the bottom front gate roll 50 for opposed rotation. In one aspect, the drive system may disengage from the module-forming arrangement 34 to pause or halt advancement of the belts 42 prior to transitioning the rear roll 114 from the first position to the second position. Accordingly, the belts 32 and the belts 42 may be static during formation of the nip or pinch location 116. In another aspect, the drive system may continue to engage the module-forming arrangement 34 to during the transition of the rear roll 114 from the first position to the second position. In this case, the belts 32 may be static up until the formation of the nip or pinch location 116, at which time contact of the belts 32 with the belts 42 may result in the counter-clockwise advancement of the belts 32 and the rear roll 114. In either case, the drive system may independently and selectively engage at least one of the conveyor arrangement 30 and the module-forming arrangement 34 during or after the transition of the rear roll 114 from the first position to the second position.

In some embodiments, the opposed rotation of the rear roll 114 and the bottom front gate roll 50 and the corresponding belts 32 and 42 may positively guide the wrapping material 66 around the module 58. For example, the wrapping material 66 may be guided along the wrap floor 88 toward the nip or pinch location 116. The belts 32 and 42 may be engaged by the drive system prior to the wrapping material 66 entering the nip or pinch location 116 or after the wrapping material 66 is adjacent or in communication with the nip or pinch location 116. Thereafter, the opposed rotation of the rear roll 114 and the bottom front gate roll 50 may positively guide the wrapping material 66 between the belts 32 and the belts 42 through the nip or pinch location 116 and around the module 58.

In some embodiments, as soon as the wrapping material 66 has entered the module-forming chamber 36, the mechanism 112 may be actuated to transition the rear roll from the second position back to the first position. In other embodiments, once the wrapping material 66 has passed around the module 58 a prescribed number of times (or fraction thereof), the mechanism 112 may be actuated to transition the rear roll 114 from the second position back to the first position. In yet other embodiments, an operator or a sensor may provide a signal to the mechanism 112 to transition the rear roll 114 from the second position to the first position during or after the wrapping operation. Further, the drive system may engage or disengage the conveyor arrangement 30 as necessary. Once the rear roll 114 is returned to the first position by the mechanism 112, the drive system of the cotton harvester 10 may again engage the conveyor arrangement 30 in preparation for the formation of a new module 58.

In summary, the rear roll 114 may be in a first position during the formation of a module 58. When the module 58 has reached a prescribed size, the mechanism 112 may transition the rear roll 114 to the second position, wherein the belts 32 may engage the belts 42 to form a nip or pinch location 116 between the rear roll 114 and the bottom front gate roll 50. The wrapping material 66 may be guided into the nip or pinch location 116 and the opposed rotation of the rear roll 114 and the bottom front gate roll 50 may positively feed the wrapping material 66 in the module-forming chamber 36 and around the module 58. Notably, in the illustrated embodiment, the rear roll 114 may freely rotate when in the second position. Accordingly, only the module-forming arrangement 34 need be engaged by the drive system to rotate the rear feed roll 114. That is, the friction between the belts 32 and the belts 42 between the rear roll 114 and the bottom front gate roll 50 may be sufficient to couple the rear roll 114 and the bottom front gate roll 50 for opposed rotation. However, it is possible that in other embodiments, the drive system may engage a component of the conveyor arrangement 30, the module-forming arrangement 34, another component altogether, or a combination thereof.

With respect to the mechanism 112, embodiments of a wrap feed roll arrangement 110 may include two or more mechanisms 112. For example, a wrap feed roll arrangement 110 may include a pair of mechanisms 112 mounted on opposite sides of the conveyor arrangement 30 in order to mount each end of the rear wrap roll 114. Further, while the mechanism 112 is depicted as a coupling moveable with a pneumatic piston, other types of mechanisms may be used. For example, it may be useful to substitute or augment the mechanism 112 with a bi-stable mechanism, a roller screw, a hydraulic piston, or another type of linear or non-linear actuator. In another aspect, two or more different types of mechanism may be used to transition the wrap feed roll arrangement 110 from the first position to the second position. Moreover, it may be useful to move the bottom front gate roll 50 or another roll as an alternative (or in addition) to moving the rear feed roll 114.

Figure 9:
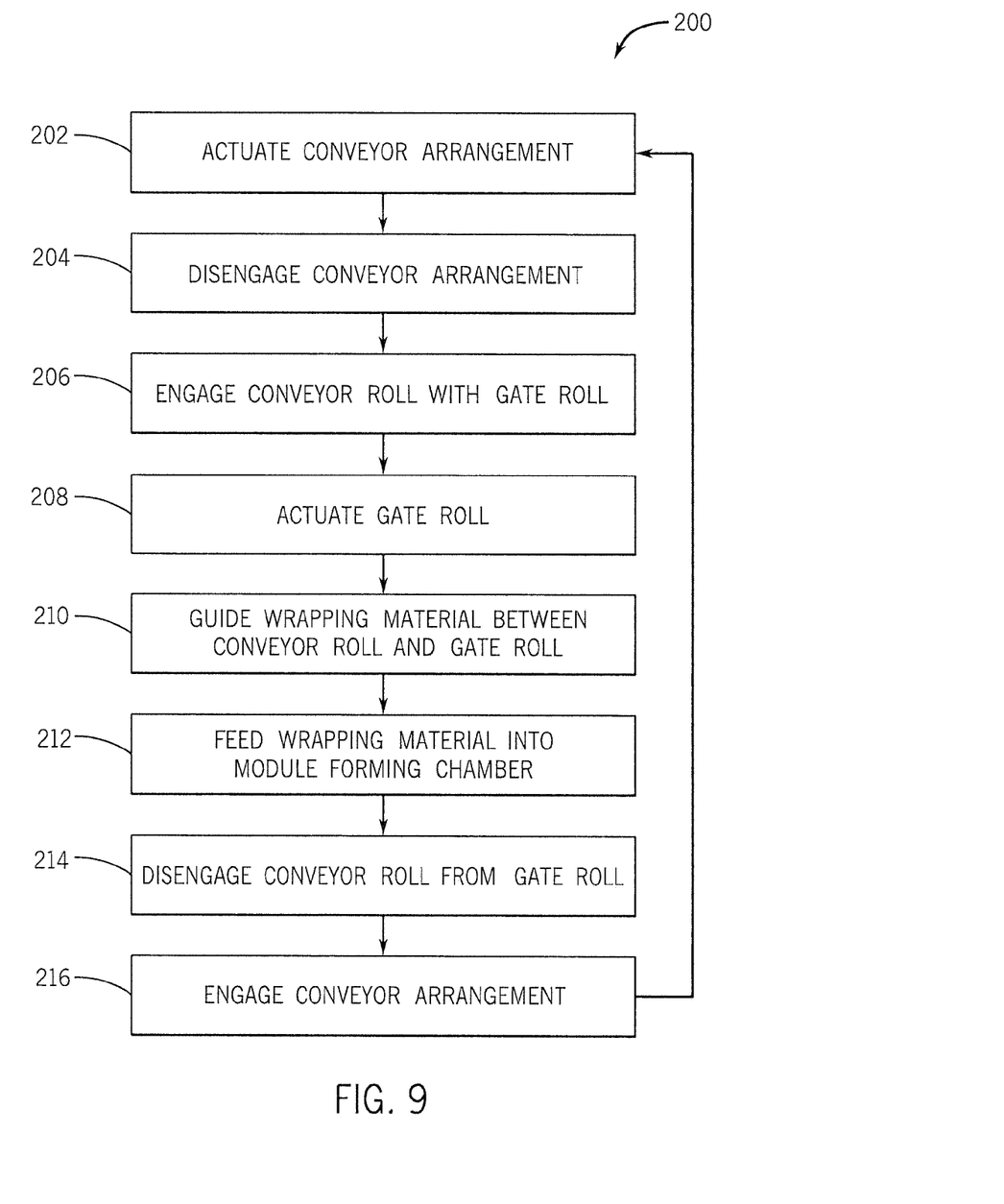
FIG. 9 is an example method for operating a wrap feed roll arrangement according to the present disclosure.

Referring also to FIG. 9, an example method 200 according to the present disclosure includes a first step 202 in which a conveyor arrangement including one or more conveyor rolls is actuated. The conveyor arrangement may be a portion of a harvester, such as harvester 10. The harvester may include a module-forming chamber having a module-forming arrangement including one or more gate rolls. Actuation of the conveyor arrangement may include engagement with a drive system of the harvester either directly or indirectly. The rear conveyor roll of the conveyor arrangement may be actuated with the drive system. Thereafter, a step 204 may include disengaging the conveyor arrangement. The step 204 may include disengaging the drive system from the conveyor arrangement or from a component thereof, such as a rear conveyor roll or another roll of the conveyor system.

With the conveyor arrangement disengaged, a step 206 may include engaging a conveyor roll with a gate roll of a module-forming arrangement. In one aspect, a mechanism may transition one or more components of the conveyor arrangement from a first, disengaged position to a second, engaged position. For example, the rear conveyor roll of the conveyor system may be moved to a position adjacent to the gate roll. The gate roll may be the bottom from gate roll of a module-forming arrangement or another roll positioned proximate an inlet to the module-forming chamber for guiding a wrapping material about a module of crop material positioned therein. Further, engagement of the conveyor roll with the gate roll may result in the formation of a pinch location between the two rolls. For example, one or more belts may be positioned for travel over each of the conveyor and gate rolls. The belts of the corresponding rolls may come into contact at the pinch location between the conveyor and gate rolls.

In a next step 208 of the method 200, the gate roll may be actuated. Actuation of conveyor roll and the gate roll may be coupled for opposed rotation upon engagement in the step 206. Accordingly, actuation of the gate roll may indirectly actuate the conveyor roll for opposed rotation. A step 210 may then include guiding a wrapping material between the conveyor roll and the gate roll. The wrapping material may be guided towards the nip or pinch location between the conveyor and gate rolls. With the wrapping material positioned in the pinch location, the opposed rotation of the rolls may be used to feed the wrapping material into the module-forming chamber of the harvester in a step 212 to wrap a module of crop material therein. Once the wrapping of the module is underway, in a step 214, the conveyor roll may be disengaged or transitioned away from the gate roll. This transition may be effected by the mechanism used to engage the conveyor roll with the gate roll in the step 206. Thereafter, in a step 216 of the method 200, the conveyor arrangement may again be engaged, such as by a drive system of the harvester. For example, it may be useful to engage the conveyor arrangement to begin the formation of a new module of crop material.

It will be appreciated that the order and timing of the steps illustrated in the method 200 may be varied. As described above, for example, the gate roll may be actuated before or after the conveyor roll is engaged with the gate roll. In another example, the conveyor roll may become disengaged from the guide roll during or after a wrapping operation. Therefore, the timing and order of the various steps of the method 200 may be varied without departing from the scope of the present disclosure.

As will be appreciated by one skilled in the art, various aspects of the disclosed method may be embodied as a computer-implemented method, a system, or a computer program product. Accordingly, certain implementations may be implemented entirely as hardware, entirely as software (including firmware, resident software, micro-code, etc.) or as a combination of software and hardware aspects. Furthermore, certain implementations may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

Each reference identified in the present application is herein incorporated by reference in its entirety.

What is claimed is:

1. A wrap feed arrangement for an agricultural harvester having a module-forming chamber, the arrangement comprising:
    a conveyor arrangement including a first roll and a first endless member disposed about the first roll and configured to rotate to deliver crop material to the module-forming chamber of the agricultural harvester;
    a module-forming arrangement associated with the module-forming chamber of the agricultural harvester, the module-forming arrangement having a second roll and a second endless member disposed about the second roll and configured to rotate to form a module within the module-forming chamber; and
    a slide mechanism having a carriage and an actuator, the carriage having a guide having a first mounting bracket that couples to the actuator and having a second mounting bracket having a wall with a track opening configured to accommodate an axle mounting a sprocket;
    wherein at least one of the first and second rolls is movable by the slide mechanism from a first position in which the first and second endless members are disengaged to a second position in which the first and second endless members are engaged.

2. The arrangement of claim 1, wherein the first and second rolls counter-rotate so that the first and second endless members engage and travel in a common direction at a nip location at an inlet to the module-forming chamber of the agricultural harvester.

3. The arrangement of claim 1, wherein the first and second endless members are belts.

4. The arrangement of claim 3, wherein each of the first and second endless members includes a plurality of belts.

5. The arrangement of claim 1, wherein the first roll is mounted for translation between the first position and the second position, and wherein the first roll translates in a direction orthogonal to an axis of rotation of the first roll.

6. The arrangement of claim 5, wherein the slide mechanism is coupled to the first roll for translation of the first roll from the first position to the second position.

7. The arrangement of claim 6,
    wherein actuation of the actuator translates the carriage in a direction of travel extending between the axes of rotation of the first and second rolls.

8. The arrangement of claim 7, wherein the actuator is a piston-cylinder arrangement.

9. The arrangement of claim 7, wherein the second mounting bracket couples to the first roll.

10. The arrangement of claim 9, wherein the sprocket is a fixed sprocket on which the carriage slides.

11. The arrangement of claim 10, wherein the first roll is coupled for rotation with a one-way sprocket, and wherein in the first position, the one-way sprocket engages the fixed sprocket to prevent rotation of the first roll in at least one rotational direction, and wherein in the second position, the one-way sprocket is disengaged from the fixed sprocket to enable rotation of the first roll in either rotational direction.

12. A wrap feed arrangement for an agricultural harvester having a module-forming chamber, the arrangement comprising:
    a conveyor arrangement including a first roll and a first endless member disposed about the first roll and configured to rotate to deliver crop material to the module-forming chamber of the agricultural harvester;
    a module-forming arrangement associated with the module-forming chamber of the agricultural harvester, the module-forming arrangement having a second roll and a second endless member disposed about the second roll and configured to rotate to form a module within the module-forming chamber; and
    a slide mechanism coupled to at least one of the first and second rolls for translation of at least one of the first and second rolls from a first position to a second position, the slide mechanism having a carriage and an actuator, the carriage having a guide having a first mounting bracket that couples to the actuator and having a second mounting bracket having a wall with a track opening configured to accommodate an axle mounting a sprocket;
    wherein in first position the first and second endless members are disengaged and in the second position the first and second endless members are engaged.

13. An agricultural harvesting machine, comprising:
    a module-forming chamber;
    a conveyor arrangement including a first roll and a first endless member disposed about the first roll and configured to rotate to deliver crop material to the module-forming chamber of the agricultural harvester; and
    a module-forming arrangement associated with the module-forming chamber having a second roll and a second endless member disposed about the second roll and configured to rotate to form a module within the module-forming chamber;
    a slide mechanism having a carriage and an actuator, the carriage having a guide having a first mounting bracket that couples to the actuator and having a second mounting bracket having a wall with a track opening configured to accommodate an axle mounting a sprocket;
    wherein at least one of the first and second rolls is movable by the slide mechanism from a first position in which the first and second endless members are disengaged to a second position in which the first and second endless members are engaged.

14. The machine of claim 13, wherein the first and second rolls counter-rotate so that the first and second endless members engage and travel in a common direction at a nip location at an inlet to the module-forming chamber of the agricultural harvester.

15. The machine of claim 13, wherein the first and second endless members are belts, and wherein each of the first and second endless members includes a plurality of belts.

16. The machine of claim 13, wherein the first roll is mounted for translation between the first position and the second position, and wherein the first roll translates in a direction orthogonal to an axis of rotation of the first roll.

17. The machine of claim 13,
wherein actuation of the actuator translates the carriage in a direction of travel extending between axes of rotation of the first and second rolls.

18. The machine of claim 17, wherein the second mounting bracket couples to the first roll.

19. The machine of claim 18, wherein the sprocket is a fixed sprocket on which the carriage slides.

20. The machine of claim 19, wherein the first roll is coupled for rotation with a one-way sprocket, and wherein in the first position, the one-way sprocket engages the fixed sprocket to prevent rotation of the first roll in at least one rotational direction, and wherein in the second position, the one-way sprocket is disengaged from the fixed sprocket to enable rotation of the first roll in either rotational direction.

* * * * *

UNITED STATES PATENT AND TRADEMARK OFFICE
CERTIFICATE OF CORRECTION

PATENT NO. : 10,279,940 B2
APPLICATION NO. : 14/729943
DATED : May 7, 2019
INVENTOR(S) : Weber et al.

Page 1 of 1

It is certified that error appears in the above-identified patent and that said Letters Patent is hereby corrected as shown below:

In the Claims

In Column 15, Claim 7, Line 60, delete "axes" and insert -- axis --, therefor.

In Column 15, Claim 7, Line 61, delete "rotation of the first and second rolls" and insert -- rotation of the first roll and an axis of rotation of the second roll --, therefor.

In Column 17, Claim 17, Line 3, delete "axes" and insert -- the axis --, therefor.

In Column 17, Claim 17, Lines 3-4, delete "rotation of the first and second rolls" and insert -- rotation of the first roll and an axis of rotation of the second roll --, therefor.

Signed and Sealed this
Nineteenth Day of November, 2019

Andrei Iancu
*Director of the United States Patent and Trademark Office*